(12) United States Patent
Tippmann et al.

(10) Patent No.: US 10,225,893 B2
(45) Date of Patent: Mar. 5, 2019

(54) COOKING APPARATUS

(71) Applicant: TF Cardinal LLC, Fort Wayne, IN (US)

(72) Inventors: Benjamin Tippmann, Fort Wayne, IN (US); Timothy Matthew Tippmann, Fort Wayne, IN (US); Bradley Wyatt Sordelet, Fort Wayne, IN (US)

(73) Assignee: TF Cardinal LLC, Fort Wayne, IN (US)

( * ) Notice: Subject to any disclaimer, the term of this patent is extended or adjusted under 35 U.S.C. 154(b) by 734 days.

(21) Appl. No.: 13/835,142

(22) Filed: Mar. 15, 2013

(65) Prior Publication Data
US 2014/0263285 A1    Sep. 18, 2014

(51) Int. Cl.
| | |
|---|---|
| *H05B 6/12* | (2006.01) |
| *H05B 6/70* | (2006.01) |
| *H05B 6/64* | (2006.01) |
| *H05B 6/80* | (2006.01) |
| *H05B 3/68* | (2006.01) |
| *A47J 37/06* | (2006.01) |

(52) U.S. Cl.
CPC ............ *H05B 6/80* (2013.01); *A47J 37/0611* (2013.01); *H05B 6/6482* (2013.01); *H05B 2206/044* (2013.01)

(58) Field of Classification Search
CPC .. H05B 6/062; H05B 2213/06; H05B 6/6438; Y02B 40/123
See application file for complete search history.

(56) References Cited

U.S. PATENT DOCUMENTS

| | | | | |
|---|---|---|---|---|
| 2,497,753 A | * | 2/1950 | Arnot .................. | D06F 79/04 219/624 |
| 3,821,594 A | * | 6/1974 | Webb .................. | H05B 6/68 219/721 |
| 3,880,064 A | * | 4/1975 | Martinez ............. | A47J 37/0611 219/524 |
| 3,943,332 A | * | 3/1976 | Marsh ................. | A47J 37/0611 219/200 |
| 3,947,241 A | * | 3/1976 | Caridis ............... | A21B 1/24 432/121 |
| 4,051,266 A | * | 9/1977 | Goltsos .............. | B65D 81/3492 206/484 |

(Continued)

FOREIGN PATENT DOCUMENTS

| | | |
|---|---|---|
| EP | 2063686 | 5/2009 |
| EP | 2329751 | 6/2011 |

(Continued)

*Primary Examiner* — David Angwin
*Assistant Examiner* — Gyounghyun Bae (57) ABSTRACT

The present invention is directed to an apparatus for cooking food products on both sides and, simultaneously, cooking them in the middle, and a method of cooking food products using said apparatus. In preferred embodiments, versions of the apparatus of the present invention comprise a crown pivotally connected to a base support, connected to a base, wherein when the crown is in the closed position with respect to the base food to be cooked is substantially enclosed in a cooking chamber comprising substantially a lower cook surface of 100 square inches or greater, a top cook surface of similar size, and is also subjected to microwaves generated by microwave generators located in the crown.

16 Claims, 8 Drawing Sheets

(56) References Cited

U.S. PATENT DOCUMENTS

| | | | |
|---|---|---|---|
| 4,340,800 A * | 7/1982 | Ueda | H05B 6/6435 219/714 |
| 4,409,452 A * | 10/1983 | Oouchi | A47J 37/041 126/338 |
| 4,670,271 A * | 6/1987 | Pasternak | A23G 3/28 426/104 |
| 4,726,973 A | 8/1988 | Schultz | |
| 4,987,827 A * | 1/1991 | Marquez | A47J 37/0611 99/331 |
| 5,180,895 A | 1/1993 | Briggs et al. | |
| 5,200,225 A * | 4/1993 | Apaydin | A21D 13/007 126/20 |
| 5,253,565 A * | 10/1993 | Burton | A47J 37/0611 219/524 |
| 5,742,032 A * | 4/1998 | Eke | H05B 6/6473 219/681 |
| 5,998,775 A * | 12/1999 | Sung | H05B 6/74 219/709 |
| 7,449,665 B2 | 11/2008 | Fadelli et al. | |
| 7,507,939 B2 | 3/2009 | Baumann | |
| 2003/0226452 A1* | 12/2003 | Artt | A21B 1/26 99/446 |
| 2004/0020371 A1* | 2/2004 | Patenotre | A47J 36/10 99/331 |
| 2004/0065658 A1* | 4/2004 | Damiano | A47J 36/2483 219/524 |
| 2006/0289514 A1* | 12/2006 | Baumann | A47J 36/38 219/729 |
| 2006/0289526 A1* | 12/2006 | Takizaki | H05B 6/6402 219/746 |
| 2007/0210063 A1* | 9/2007 | Conrad | A23L 1/01 219/449.1 |
| 2008/0099471 A1* | 5/2008 | Fadelli | A47J 37/0611 219/685 |
| 2008/0125195 A1* | 5/2008 | Maenpaa | H04M 1/0216 455/575.3 |
| 2008/0202352 A1* | 8/2008 | Comito | H05B 6/6426 99/339 |
| 2010/0282097 A1* | 11/2010 | Schulte | A21B 1/245 99/476 |
| 2011/0062151 A1* | 3/2011 | Tassan-Mang-Ina | A47J 37/0611 219/690 |
| 2011/0132895 A1* | 6/2011 | Tassan-Mangina | A47J 37/0611 219/450.1 |
| 2011/0297672 A1 | 12/2011 | Niklasson et al. | |

FOREIGN PATENT DOCUMENTS

| | | |
|---|---|---|
| JP | 09-049635 | 2/1997 |
| JP | 2002-031349 | 1/2002 |
| JP | 2007-130149 | 5/2007 |
| WO | 2003098972 A1 | 11/2003 |

\* cited by examiner

COOKING APPARATUS

CROSS-REFERENCES TO RELATED APPLICATIONS

None.

STATEMENT REGARDING FEDERALLY SPONSORED RESEARCH OR DEVELOPMENT

Not applicable.

BACKGROUND

The present invention refers to an apparatus used to cook food products on both sides, while simultaneously optionally heating the inner portion of the food product, and methods of using the same. Cooking devices of various kinds are widely known to the art. Cooking devices known to the art typically fall into two categories: devices adapted to cook food from the outside-in, and devices adapted to cook food from the inside-out. Traditional outside-in devices such as ranges, broilers, griddles, grills, and panini presses use contact heat or infrared radiation to cook a food product, starting at the surface. Since the temperature of the food product is raised first and most at the outside, care must be taken to avoid burning the outer surface of the food product before the inner portion is cooked.

While outside-in methods of cooking may have some success for some types of food, they are not well-suited for foods desired to be cooked on both sides simultaneously, such as panini sandwiches. Apparatuses known to the art often result in such food products being browned or cooked on the outside, but substantially un- or undercooked on the inside.

Inside-out cooking techniques known to the an consist primarily of ovens that use microwave radiation. Microwave cooking techniques known to the art are directed to cooking food inside-out. Microwave cooking involves subjecting a food product to microwave radiation, which heats the product by irradiative excitement of water, fat, and sugar molecules within the food. Microwave cooking techniques have the advantage of cooking food products more uniformly than contact-heating apparatuses; however, they have their own substantial drawbacks. Most notably, microwave cooking techniques do not sear or crisp the exterior of the food product, and often result in a soggy or undesirable texture.

U.S. Pat. No. 7,507,939 attempts to solve these problems through a cooking apparatus that provides contact heat to the top and bottom of a food product to cook the outer surface, while directing microwaves through a lower heating element to heat the inner portion. This approach suffers a number of drawbacks. Most notably, the lower heating surface, to be microwave-transparent and capable of sustaining cooking temperatures, must be comprised of a limited range of materials with limited structural strength. As a result, the lower heating surface of apparatuses of this approach have significantly limitations on the weight of the food product that can be cooked, and also have significant limitations on the total surface area of lower heating surface that can be maintained without bowing or cracking. Further, the configuration and materials of the lower cooking surface adapted to allow microwave radiation to pass through the limit the cooking temperature capabilities of the lower heating surface, extending cooking times and limiting the ability of the apparatus to suitably crisp or sear the outer portion of the food.

SUMMARY

It is therefore an object of the present invention to provide an apparatus for heating, and preferably for searing or crisping, food on both sides while adequately cooking the interior of the food, at higher temperatures and in shorter times possible than accomplished by devices known to the art.

It is a further object of the present invention to provide an apparatus for heating, and preferably for searing or crisping, food on both sides while adequately cooking the interior of the food with an improved surface area for cooking, facilitating the preparation of greater quantities of food at once.

It is further an object of the present invention to provide an apparatus that cooks food to be hot on the inside, and have improved sear or crispiness on the outside, compared to devices known to the art.

Additional features and advantages of the present invention will be more readily understood from the description of a preferred, although not sole, embodiment that is given below by way of non-limiting examples with reference to the accompanying drawings.

Those skilled in the art will recognize that many designs and embodiments of the present invention are possible, and that the invention is not limited to the specific embodiments discussed herein.

BRIEF DESCRIPTION OF DRAWINGS OF A PREFERRED EMBODIMENT

DETAILED DESCRIPTION

Versions of the present invention are directed to an apparatus for cooking food products on both sides and also in the interior, simultaneously if desired. As shown generally in FIG. 1, the cooking apparatus comprises a base (1), a base support, (3), and a crown (5). The base (1) is connected to the base support (3), and the base support is connected pivotally to the crown (5) by a pivoting means (50), as discussed in more detail herein.

Figure 1:
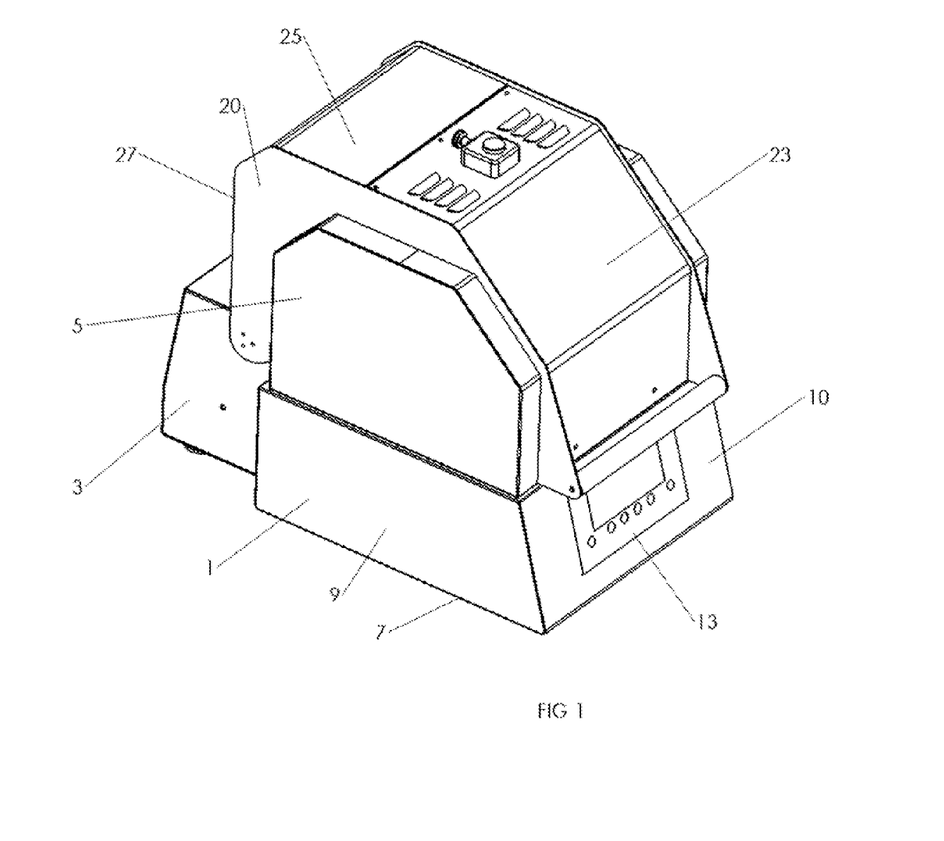
FIG. 1 is a perspective view of an apparatus according to the present invention, as shown in its closed state.
Figure 2:
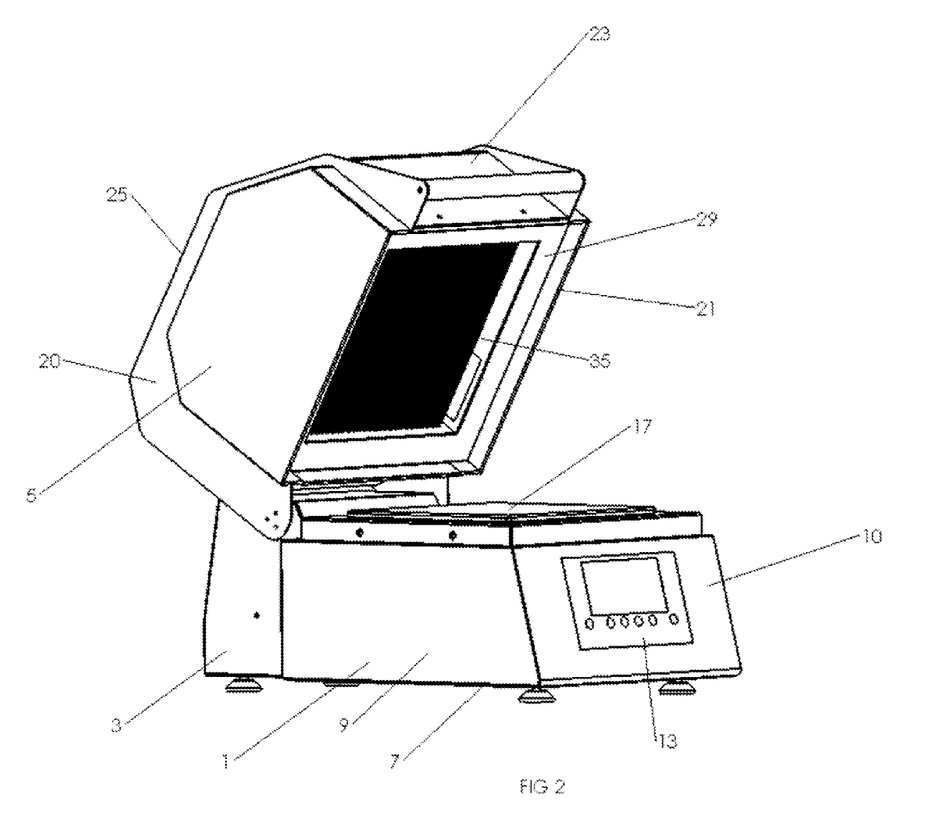
FIG. 2 is a perspective view of an apparatus according to the present invention, as shown in its open state.
Figure 6:
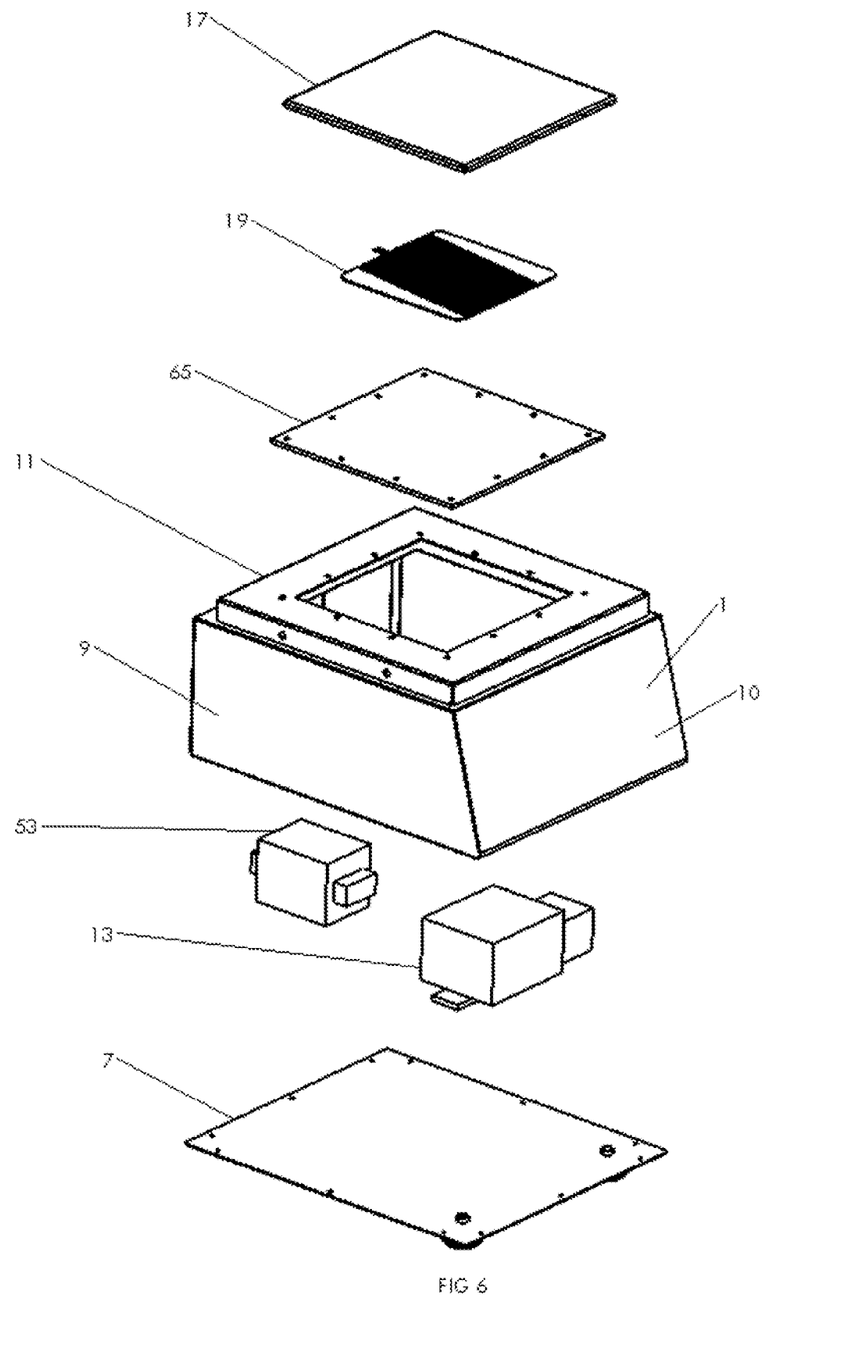
FIG. 6 is an exploded view of the base portion of a preferred embodiment of the present invention.

The base (1) according to versions of the present invention generally comprises a container comprising a bottom member (7), side members (9), and an upper member (11). The bottom member (7) and side members (9) of the base (1) may comprise solid panels, supporting rods or struts, or any other structural configuration suitable to support the upper member (11). Optionally, one or more of said bottom member (7) and side members (9) comprise feet or pedestals for supporting said apparatus on a counter or other surface. The base (1) may optionally further comprise a base front member (10), said front member (10) optionally comprising a control panel or a cutout for access to control members (13) housed within the base (1). Preferably, the base (i) members comprise solid panels substantially embodying a container, wherein the upper member (11) comprises at least part of the top of the container. In this preferred embodiment of the invention, the base (1) may optionally house control elements (13). Further optionally, power sources or transformers (53) for operative connection to heating surfaces, microwave generators, or both may be located within said base (1) and operatively connected to microwave generators in the crown (5). In a preferred embodiment, said base (1) further comprises a lower retaining plate (65) connected to said upper member (11) adapted to support one or more of a lower heating element (17) and lower heating surface (19).

Figure 8:
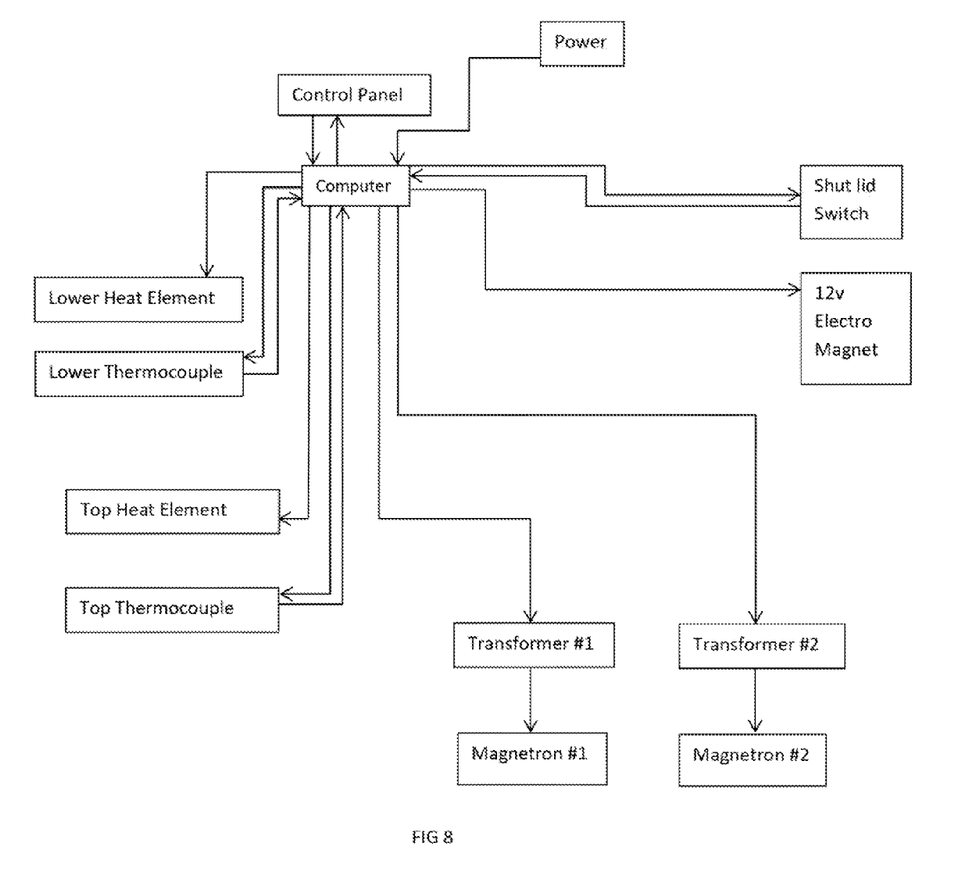
FIG. 8 is a block diagram of the control elements according to a preferred embodiment of the present invention.

Control elements (13) according to versions of the present invention comprise electronic components adapted to govern whether the cook surfaces and microwave generators of the apparatus are on or off, when and for what duration those apparatus are on or off in coordination with each other, the temperature for each cook surface, the time each cook surface remains at any given temperature, the radiation strength of microwave generators, and the time each microwave generator emits radiation. Control elements (13) can optionally include a timer, a temperature control means for said lower heating surface, a temperature control means for said top heating surface, a timer control means for said microwave generator, a radiation strength control means for said microwave generator, and a computer.

As will be apparent to one skilled in the art, one or more of said control elements (13) can be operatively connected to said computer, and said computer can utilize said control elements (13) to run cooking programs. For example, said computer can be operatively connected to a temperature control means for said lower heating surface, a temperature control means for said top heating surface, a timer control means for said microwave generator, and radiation strength control means for said microwave generator, such that said computer directs said top heating surface and lower heating surface to operate at a high temperature for a first fixed period of time while said microwave generator remains off, and then directs said microwave generator to emit radiation at a predefined strength for a second fixed period of time, then can direct each of said top heating surface, lower heating surface, and microwave heating surface to turn off at the end of these fixed periods of time. As will be apparent to one skilled in the a wide variety of cook temperatures per surface, cook times per surface, microwave intensity, and microwave time could be programmed to achieve specific desired results for specific food products. Optionally, said base (1) may further comprise one or more insulation layers adapted to protect said control elements (13) from heat generated by the lower heating element (19).

Figure 3:
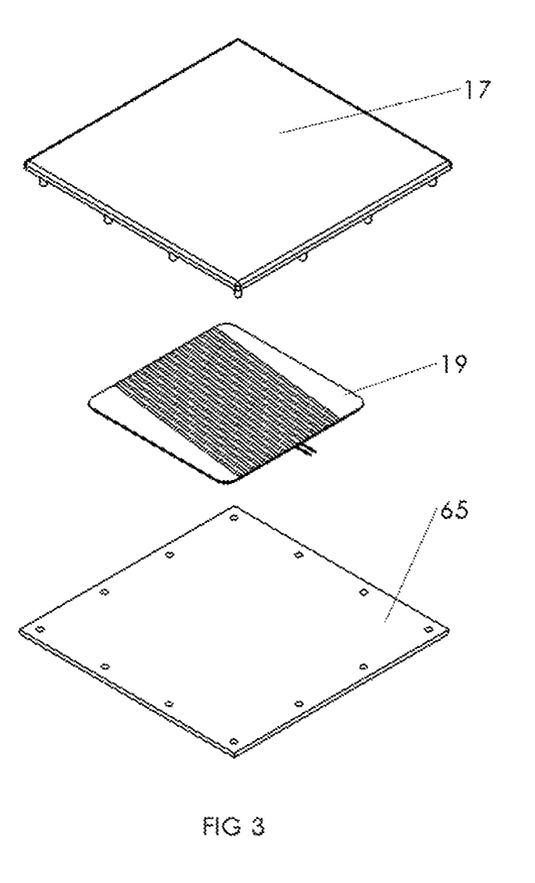
FIG. 3 is an exploded view of the lower heating assembly according to one embodiment of the present invention.

The upper member (11) of said base (1) is connected to a lower heating surface (17). Said lower heating surface (17) is operatively connected to a lower heating element (19). Said lower heating element (19) can comprise any contact heating means known to the art, including, by way of illustration, electric resistance heating filaments or sheets. Preferably, said lower heating element (19) is a resistance heating sheet adapted to heat said lower heating surface (17) at a controllable range of temperatures. Most preferably, said range of temperatures runs approximately from 350 to 500 degrees Fahrenheit. Said lower heating element 19) is operatively connected to one or more of a power source, transformers (53), and control elements (13). In a preferred embodiment, said upper member (1) supports a lower retaining member (65), and said lower heating element (19) and lower heating surface (17) are supported by said lower retaining member (65). Optionally, one or more insulation layers may be placed between said lower heating element (19) and said lower retaining plate (65) or said lower retaining plate (65) and the interior of the chamber substantially formed by said base (1).

Said lower heating surface (17) is formed of materials that are food safe and sufficiently strong to bear the weight of food products placed upon the surface when said surface is substantially supported only at the edges, and are further adapted to conduct heat substantially evenly. Such materials include, by way of example, aluminum, copper, steel, and stainless steel. Such materials may optionally be coated with a non-stick coating, including, by way of example, Teflon. Preferably, said lower heating surface (17) is comprised of a material that substantially reflects microwave radiation. Most preferably, said lower heating surface (17) is comprised substantially of Teflon-coated aluminum. The lower heating surface (17) can be of any size suitable to cook food products, and preferably has a surface area of at least 110 square inches. The lower heating surface (17) defines the floor of a substantially enclosed cooking chamber created when said crown (5) is in a closed position with respect to said base (1), in which food products are cooked according to versions of the present invention.

Figure 7:
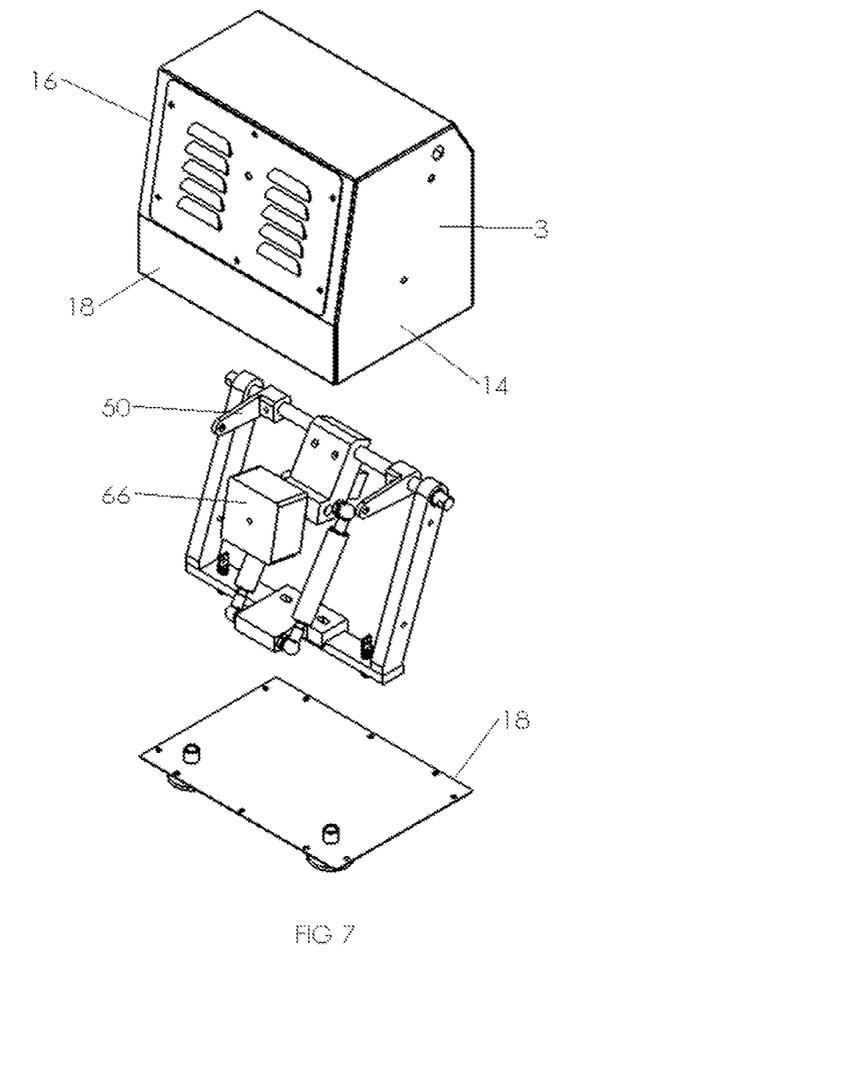
FIG. 7 is an exploded view of the base support portion of a preferred embodiment of the present invention.

The base support (3) of versions of the present invention is connected to the base (1). The base support (3) comprises at least a first member (14) fixedly connected to said base (1) and coupled to said crown (5) by a pivoting means (50). Preferably, said base support (3) comprises a first member (14) and a second member (16), wherein the first member (14) and second member (16) are each connected fixedly to the base (1) and are connected to each other by one or more connecting members (18). Optionally, a rearward-oriented side member (9) of said base (1) can function as a connecting member (18) connecting a first member (14) and second member (16). Most preferably, the base support (3) comprises a first member (14) and second member (16) wherein both the first member (14) and second member (16) are connected to each other by at least one rearward-oriented side member (9) and at least one bottom-oriented connecting member (18).

Said pivoting means (50) may comprise a direct pivotal coupling between one or more of said first member (14), said second member (16), or said connecting member (18) with said crown (5). Preferably, said pivoting means (50) comprises one or more arms, wherein at least one of said arms couples pivotally or fixedly to at least said first member (14), and couples pivotally to said crown (5). More preferably, said pivoting means comprises a first arm coupled pivotally to said first member (14) and coupled pivotally to said crown (5), and a second arm coupled pivotally to said second member (16) and coupled pivotally to said crown (5). Optionally, said pivoting means (50) may limit the range of articulation of said crown (5) with respect to said base (1). In a preferred embodiment, said pivoting means (50) further comprises a lift assist means, such as a hydraulic lift assist as depicted in FIG. 7. In the preferred embodiment depicted in FIG. 7, said pivoting means (50) further comprises a retaining electromagnet (66) adapted to resist inadvertent opening of said crown (5) during use of the apparatus. Said retaining electromagnet (66) may optionally be operatively connected to an interlock switch such that said retaining electromagnet (66) is energized when said crown (5) is in a closed position with respect to said base (1) and said apparatus is supplied with power.

Said base support (3) may optionally include feet or pedestals adapted for assisting the base (1) in supporting the apparatus on a counter or other surface. As will be apparent to one skilled in the art, the members of the base support (3) may comprise solid panels, rods or struts, or any other structural configuration suitable to connect to the base (1) and support said crown (5). The base support (3) may optionally house wiring, transformers, power sources, and one or more control elements (13). Preferably, the base support (3) further houses an interlock switch governing operation of the apparatus when the crown (5) is in an open position with respect to the base (1).

Figure 5:
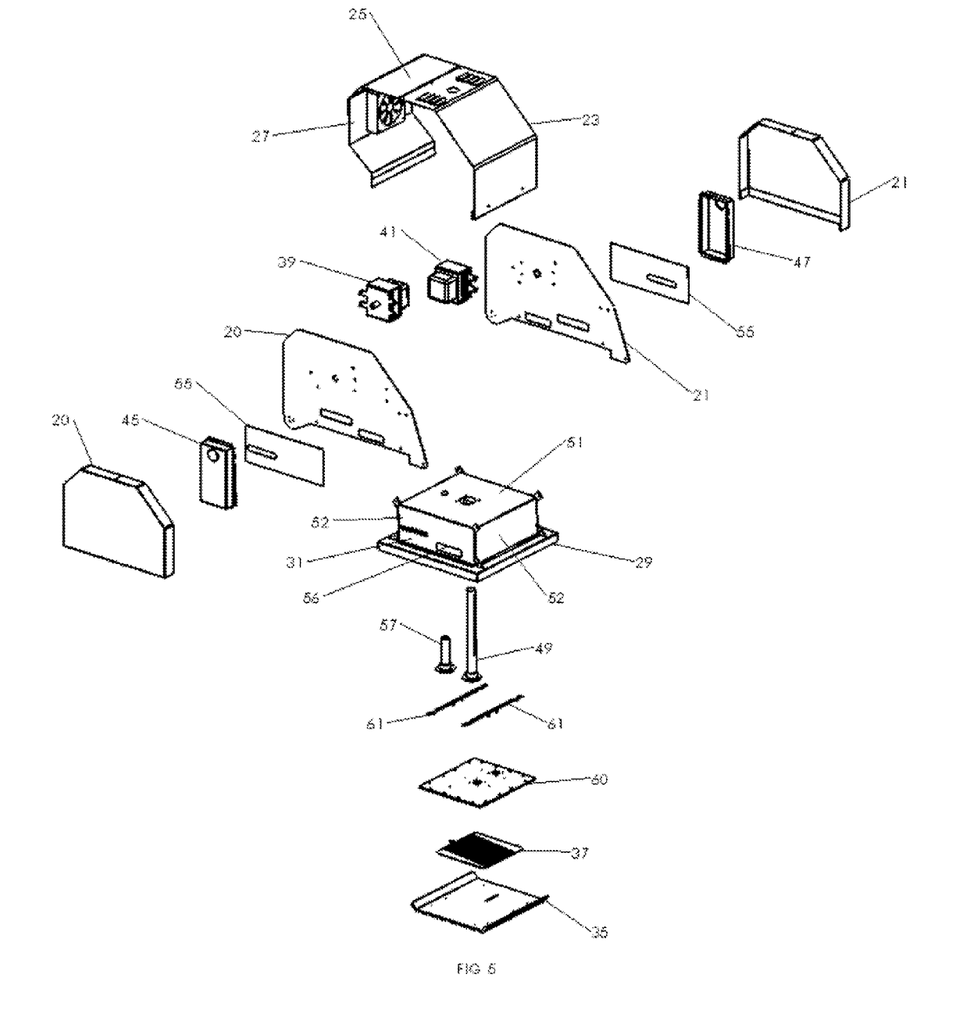
FIG. 5 is an exploded view of the crown portion of a preferred embodiment of the present invention.

The crown (5) of versions of the present invention substantially comprises a container comprising first side member (20), a second side member opposite said first side member (21), a crown front member (23), an upper member (25), a back member opposite said front member (2), and a lower member (29) substantially opposite said upper member (25). A portion of said back member (27) is coupled to said base support (3) via a pivoting means (50). Optionally, the from member (23) or upper member (25) of said crown (5) may comprise a handle for lifting or lowering said crown (5) with respect to said base (1). Preferably, the members of the crown (5) comprise solid panels substantially forming a container.

The crown (5) substantially encloses the top and side walls of a cooking chamber (31) configured to substantially enclose food to be cooked when said crown (5) is in a closed position with respect to said base (1). When the apparatus is in the closed position, said cooking chamber (31) has a ceiling (51), a floor comprising the lower heating surface (17), and walls (52) extending upwardly from said lower member (29) of the crown (5), along the edges of said top heating surface (35), to the cook chamber ceiling (51). When said crown (5) is in a closed position with respect to the base (1), said cook chamber walls (52) define the sidewalls of the cooking chamber (31) in which food products can be cooked according to versions of the present invention. Said walls (52) extend upwardly from said lower member (29) to a height suitable to accommodate food items of desired size.

The ceiling (51) of said cooking chamber functions to retain said top heating surface (35) within a desired range of adjustable heights. Said top heating surface (35) preferably is substantially the same shape and surface area as said ceiling (51), although it will be understood by one skilled in the art that said top heating surface (35) may vary slightly in size and shape to fit within said cooking chamber walls (52). Said cooking chamber ceiling (51) preferably has one or more openings adapted to accommodate the electrical connection of said top heating surface (35) or top heating element (37) to one or more of power supplies, transformers (53), and control elements (13), and also to accommodate a slidable connection between said top heating surface (35) and said crown (5). Said cook chamber (31) may optionally comprise one or more apertures (56) adapted to allow ingress of microwave radiation from one or more waveguides or egress of air from said cook chamber (31).

The top heating surface (35), lower heating surface (17), and cooking chamber walls (52) comprise radiation shields composed substantially of material suitable to substantially contain or reflect microwave radiation. Suitable materials are known to those skilled in the art and include lead, aluminum, and steel. Optionally, other portions of the crown (5) may be substantially of material suitable for radiation shielding.

Figure 4:
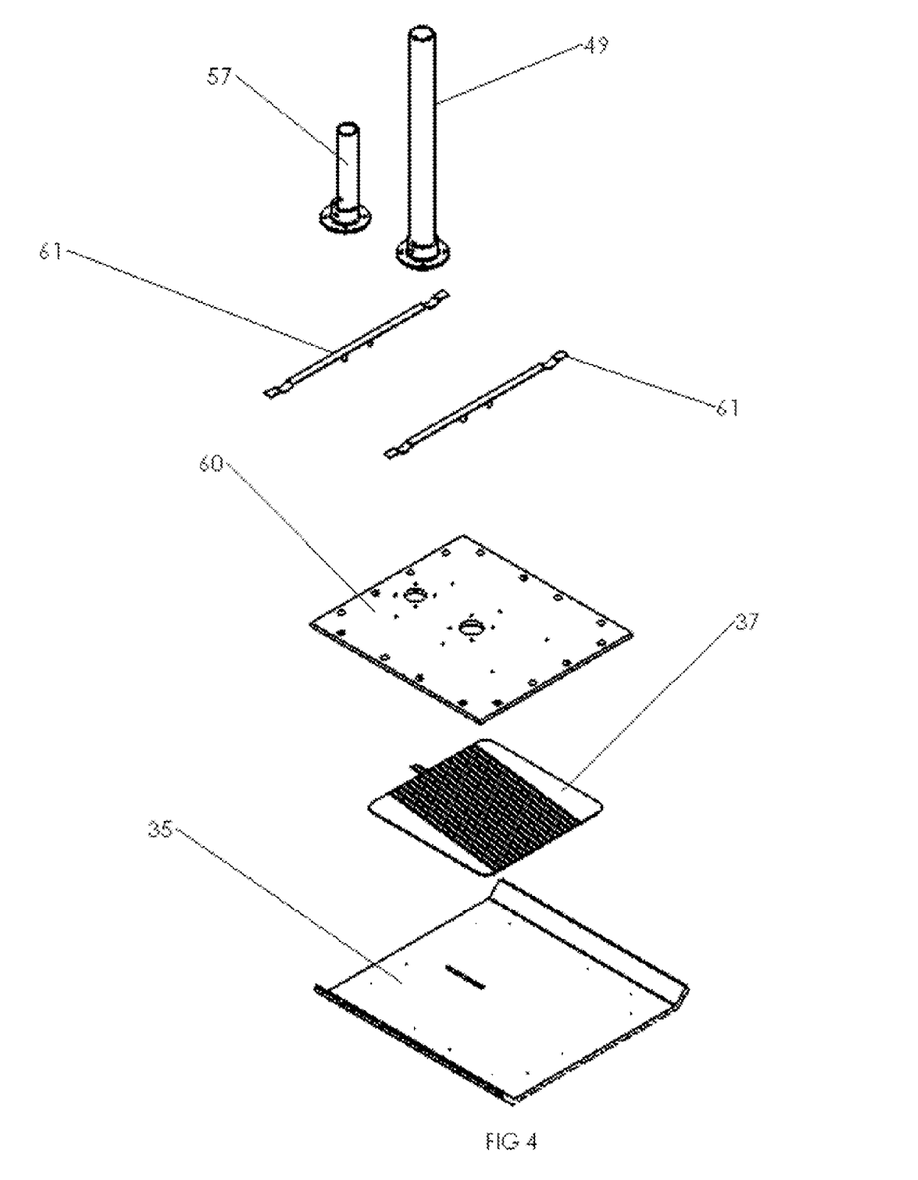
FIG. 4 is an exploded view of the top heating assembly according to one embodiment of the present invention.

The lower member (29) of said crown (5) comprises a support member adapted to support the cook chamber walls (52) fixedly, and further comprises said top heating surface (35). Said top heating surface (35) is operatively connected to a top heating element (37), which is operatively connected to one or more of said power supplies, transformers (53), and control elements (13). Said top heating element (37) may comprise any contact heating means known to the art, including, by way of illustration, electric resistance heating filaments or resistance heating sheets. Preferably, said top heating element (37) is a resistance heating sheet adapted to heat said top heating surface (35) at a controllable range of temperatures. Most preferably, said range of temperatures runs from 350 to 500 degrees Fahrenheit.

Said top heating surface (35) is formed of a material that is food safe and suitable to conduct heat substantially evenly from the top heating element (37) to the food product to be cooked. Such materials include, by way of example, aluminum, copper, steel, and stainless steel. Such materials may optionally be coated with a non-stick coating, including, by way of example, Teflon. Optionally, said top heating surface (35) is comprised of a material that substantially contains microwave radiation. Preferably, said top heating surface (35) is composed substantially of aluminum. In a preferred embodiment, said top heating surface (35) is fixedly connected to said top heating element (37) by a retaining plate (60). Said top heating surface (35) may optionally be wholly or partly covered with Teflon-coated paper prior to or during use. In a preferred embodiment, said retaining plate (60) or an optional cover on said retaining plate (60) may comprise one or more retaining clips (61) adapted to retain Teflon paper or other paper-like materials wrapped around said top heating surface (35). Said top heating surface (35) can be of any size suitable to cook food products. Preferably, the top heating surface (35) has a surface area substantially similar to the surface area of said lower heating surface (17).

Said top heating surface (35) may be fixedly connected to said crown (5), or it may be adjustably connected to said crown (5) to accommodate food products of varying heights. In a preferred embodiment, the top heating surface (35) is adjustably connected to the crown upper member (27) by one or more slidable risers (49), such that said top heating surface (35) automatically raises or lowers to accommodate food products within a range of heights when said food products to be cooked are placed on said lower heating surface (17) and said crown (5) is articulated to a closed position with respect to said base (1). In a preferred embodiment, said one or more risers (49) connect to said top heating surface (35) through an opening in the cooking chamber ceiling (51). Optionally, said risers can be biased, for example by springs, to increase or decrease contact pressure between the top heating surface (35), lower heating surface (17) and food product to be cooked when the crown (5) is in a closed position with respect to the base (1). Preferably, said top heating surface (35) will be adjustably connected to said crown (5) within a range of heights equal to or lesser than the height of said cooking chamber ceiling (51), which in preferred embodiments restricts the height to which said top heating surface (35) can rise. Preferably, said top heating element (37) is operatively connected to one or more of a power source, transformer (53), or control elements (13) through a conduit (57), which may optionally extend through an aperture in the cook chamber ceiling (51).

Said lower heating surface (17) and said top heating surface (35) may have one or more surface contours including, by way of example, smooth, ridged, hatched, or, optionally, one or more contours configured to crisp or sear a desired pattern shape, letter, logo, or imprint into the top or bottom surface of a food product. Optionally, said top heating surface (35) or said lower heating surface (17) may be replaceable, such that the one or more surface contours of the surface may be changed when desired.

The crown (5) according to versions of the present invention substantially contains one or more microwave generators and, optionally, one or more fans adapted to cool said microwave generators. As will be apparent to one skilled in the art, said microwave generators are preferably magnetron-type microwave generators suitable for use in food preparation. Such microwave generators are operatively connected to one or more power supplies or transformers (53) Such microwave generators may have internal control means, or, optionally, may be operatively connected to control elements (13). Preferably, said microwave generators are further operatively connected to an interlock switch adapted to permit the microwave generators to function only when the crown (5) is in a closed position with respect to the base (1). In a preferred embodiment of the present invention, said interlock switch is located in said base support (3).

Preferably, said crown (5) substantially encloses a first microwave generator (39) and a second microwave generator (41). Optionally, each microwave generator is located within said crown (5) between the rear wall (52) of said cooking chamber (31) and the rear member (27) of said crown (5).

Each microwave generator in versions of the present invention is operatively connected to a waveguide. The waveguide, as will be appreciated by one skilled in the art, is adapted to guide the microwaves generated by the microwave generator along a defined path to the cavity defined by the cooking chamber (31) when food is placed in the apparatus and the crown (5) is in a closed position with respect to the base (1). In versions of the present invention, each waveguide is adapted to guide radiation generated by the microwave generator to which it is operatively connected past or through one or more of the edges of said top heating surface (35) and said cooking chamber walls (52). Optionally, the waveguides direct microwave radiation through one or more apertures (56) in one or more cook chamber walls (52). In a preferred embodiment, the apparatus comprises a first microwave generator (39) operatively connected to a first waveguide (45), and a second microwave generator (41) operatively connected to a second waveguide (47). In a most preferred embodiment, the first waveguide (45) is adapted to guide the microwaves generated by the first microwave generator (39) into the cooking chamber (31) through aperture (56) in the wall (52) oriented on one side of the cooking chamber (31), and the second waveguide (47) is adapted to guide the microwaves generated by the second microwave generator (41) into the cooking chamber (31) through an aperture (56) in the wall (52) oriented to the rear of cooking chamber (31). Optionally, the crown (5) may further comprise one or more dividers (55) separating said cook chamber (31) from said waveguides.

A food product can be prepared according to the embodiments of the present invention by opening the crown (5), placing a food product on the lower heating surface (17), closing the crown (5), and directing the apparatus to begin heating by activating one or more of the top heating element (37), lower heating element (19), or microwave generators. The temperature of the heating surfaces, the strength of radiation generated by the microwave generator, and the duration of irradiation, may each be controlled through one or more control means, such as manual control, control through control elements (13), or, optionally, subject to preset conditions determined by a computer.

When the crown (5) is closed with respect to the base (1), the food product is substantially enclosed by a cooking chamber (31) comprising at least the lower heating surface (17), the top heating surface (35), and cooking chamber walls (52). Application of heat from the heating surfaces and radiation from the microwave generator heats the exterior and interior of the food product as desired.

An apparatus according to the teachings of the present invention enjoys a number of advantages compared to inventions known to the art. Larger and heavier food products are able to be cooked without worry of breakage of the lower heating member. Food products are able to be cooked faster, and at higher temperatures, decreasing cook times and improving the texture of the food product. The heating surfaces can be adapted to create grill lines or other symbols, improving the aesthetic appearance of the food product.

Although the present invention has been described in considerable detail with reference to certain preferred versions thereof, other versions are possible. Therefore, the spirit and scope of the claims should not be limited to the description of the preferred versions described herein.

What is claimed is:

1. An apparatus for cooking food products on both sides using at least a top heating element and a lower heating element, said apparatus comprising:
   (1) a base comprising at least one side panel and an upper panel, wherein said at least one side panel supports said upper panel, further comprising a lower heating surface supported by said upper panel and a lower resistive heating element thermally connected to said lower heating surface, and wherein said lower heating surface is adapted to support food products to be cooked and is suitable for use to temperatures up to 500 degrees Fahrenheit;
   (2) a base support connected to said base comprising a least a first member, wherein said first member is operatively connected to a pivotal coupling;
   (3) a crown pivotally connected to said pivotal coupling, wherein said crown comprises a first crown side panel, a second crown side panel opposite said first crown side panel, a crown front panel, a crown upper panel, a crown back panel opposite said crown front panel, and a crown lower panel opposite said crown upper panel, and wherein said pivotal coupling further comprises a retaining electromagnet adapted to resist an inadvertent opening of said crown;
   (4) a cooking chamber comprising walls extending upwardly from said crown lower panel and a ceiling attached to said walls;
   (5) a top heating surface thermally connected to a top resistive heating element, wherein said top heating surface is connected to and inside of said crown;
   (6) wherein said crown is adapted to articulate into at least an open position and a closed position with respect to said base, wherein said top heating surface is opposite said lower heating surface, and wherein said food products to be cooked are enclosed between said top heating surface, said lower heating surface, and said cooking chamber walls when said crown is articulated into the closed position with respect to said base; and
   (7) wherein said crown encloses at least a first microwave generator and a first waveguide, wherein said first waveguide directs microwaves generated by said first microwave generator into said cooking chamber when said crown is in the closed position with respect to said base and said first microwave generator emits microwave radiation.

2. The apparatus of claim 1, wherein said lower heating surface is comprised of aluminum.

3. The apparatus of claim 2, wherein said lower heating surface has a surface area of at least 100 square inches.

4. The apparatus of claim 1, wherein said first waveguide directs microwaves generated by said first microwave generator into said cooking chamber through an aperture in a cooking chamber wall, wherein said cooking chamber wall is oriented to one side of said cooking chamber.

5. The apparatus of claim 4, wherein said crown further encloses a second microwave generator and a second waveguide, wherein said second waveguide directs microwaves generated by said second microwave generator into said cooking chamber when said crown is in the closed position with respect to said base and said second microwave generator emits microwave radiation.

6. The apparatus of claim 5, wherein said second waveguide directs microwaves generated by said second microwave generator through an aperture in said cooking chamber wall, wherein said cooking chamber wall is oriented to the rear of said cooking chamber.

7. The apparatus of claim 6, wherein one or more edges of said top heating surface comprise an angled surface adapted to direct microwaves towards the center of said cooking chamber.

8. The apparatus of claim 1 wherein said base encloses one or more control elements.

9. The apparatus of claim 8 wherein said control elements comprise a computer and one or more of a timer, a temperature control for said lower heating surface, a temperature control for said top heating surface, a timer control for said microwave generator, or a radiation strength control for said microwave generator.

10. The apparatus of claim 9 in which said computer is operatively linked to at least one of said control elements other than said computer.

11. The apparatus of claim 10 wherein said computer controls one or more of the cook time or cook temperature of one or more of said lower heating surface, said top heating surface, said first microwave generator, or said second microwave generator according to a cooking program.

12. The apparatus of claim 10 wherein said cooking program directs the generation time and radiation strength of one or more of said first microwave generator or said second microwave generator in pre-set amounts.

13. The apparatus of claim 12 wherein said cooking program directs one or more of the top heating surface or said lower heating surface to achieve pre-set temperatures adapted to sear the outer surface of a food product to be cooked, said cooking program directs at least said first microwave generator to supply radiation for a pre-set time and strength adapted to heat the inner portion of said food product to be cooked, and said cooking program coordinates one or more of the temperature or cook time of said top heating surface, said lower heating surface, or said first microwave generator such that the heating elements and first microwave generator cease to cook when the food product is seared on the outside and is cooked on the inside.

14. The apparatus of claim 1 wherein said top heating surface is slidably connected to said crown such that said top heating surface automatically adjusts to varying heights according to the size of the food product to be cooked when said food product is located on said lower heating surface and said crown is articulated into a closed position with respect to said base.

15. The apparatus of claim 14, wherein said top heating surface is slidably connected to an upper member of said crown by one or more slidable risers.

16. The apparatus of claim 15, wherein said risers are operatively connected to one or more springs configured to bias said risers away from said lower heating surface such that the weight placed upon food products to be cooked by said top heating element when said crown is in a closed position with respect to said base is reduced.

\* \* \* \* \*

UNITED STATES PATENT AND TRADEMARK OFFICE
CERTIFICATE OF CORRECTION

PATENT NO. : 10,225,893 B2
APPLICATION NO. : 13/835142
DATED : March 5, 2019
INVENTOR(S) : Benjamin Tippmann et al.

It is certified that error appears in the above-identified patent and that said Letters Patent is hereby corrected as shown below:

In the Specification

Column 1, Line 36, delete "an" and insert --art--

Column 3, Line 3, delete "(i)" and insert --(1)--

Column 3, Line 67, delete "(1)" and insert --(11)--

Column 5, Line 17, delete "(2)" and insert --(27)--

Column 5, Line 21, delete "from" and insert --front--

In the Claims

Claim 15, Line 2, delete "an" and insert --said--

Signed and Sealed this
Eighteenth Day of June, 2019

Andrei Iancu
*Director of the United States Patent and Trademark Office*